United States Patent
Asai

(10) Patent No.: US 10,267,640 B2
(45) Date of Patent: Apr. 23, 2019

(54) VEHICLE POSITION ESTIMATION DEVICE, VEHICLE POSITION ESTIMATION METHOD

(71) Applicant: Nissan Motor Co., Ltd., Yokohama-shi, Kanagawa (JP)

(72) Inventor: Toshihiro Asai, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/755,794

(22) PCT Filed: Aug. 28, 2015

(86) PCT No.: PCT/JP2015/004382
§ 371 (c)(1),
(2) Date: Feb. 27, 2018

(87) PCT Pub. No.: WO2017/037752
PCT Pub. Date: Mar. 9, 2017

(65) Prior Publication Data
US 2018/0328742 A1    Nov. 15, 2018

(51) Int. Cl.
| | | |
|---|---|---|
| G01C 21/14 | (2006.01) | |
| G01C 21/30 | (2006.01) | |
| G06F 17/30 | (2006.01) | |
| G06K 9/00 | (2006.01) | |

(52) U.S. Cl.
CPC ............. *G01C 21/30* (2013.01); *G01C 21/14* (2013.01); *G06F 17/30241* (2013.01); *G06K 9/00791* (2013.01)

(58) Field of Classification Search
CPC ... G01C 21/30; G01C 21/14; G06F 17/30241; G06K 9/00791
USPC ........................................................ 701/446
See application file for complete search history.

(56) References Cited

U.S. PATENT DOCUMENTS

| 5,941,934 | A | 8/1999 | Sato | |
|---|---|---|---|---|
| 6,311,123 | B1 * | 10/2001 | Nakamura | ......... B60K 31/0008 123/352 |
| 2008/0319657 | A1 | 12/2008 | Gao | |
| 2012/0239239 | A1 | 9/2012 | Suyama | |

(Continued)

FOREIGN PATENT DOCUMENTS

| JP | H08-334363 A | 12/1996 |
|---|---|---|
| JP | 2008-241446 A | 10/2008 |

(Continued)

*Primary Examiner* — Gertrude Arthur Jeanglaude
(74) *Attorney, Agent, or Firm* — Young Basile Hanlon & MacFarlane, P.C.

(57) ABSTRACT

In this vehicle position estimation device, positions of a target present in a periphery of a vehicle are detected, amounts of movements of the vehicle are detected, and the positions of the target are stored as target position data, based on the detected amounts of movements. In addition, map information including the positions of the target is pre-stored in a map database, and, by matching the target position data and the map information, a vehicle position of the vehicle is estimated. Further, a turning point of the vehicle is detected. Furthermore, target position data in a range from a present location to a set distance and in a range going back from the turning point by another set distance to a point (the turning point—another set distance) are retained.

20 Claims, 19 Drawing Sheets

(56) References Cited

U.S. PATENT DOCUMENTS

2013/0223686 A1* 8/2013 Shimizu ................ G08G 1/166
                                                    382/103
2014/0297093 A1    10/2014 Murai et al.

FOREIGN PATENT DOCUMENTS

| JP | 2008-250906 A | 10/2008 |
| JP | 2011-191239 A | 9/2011 |
| JP | 2012-194860 A | 10/2012 |
| JP | 2013-068482 A | 4/2013 |

* cited by examiner

VEHICLE POSITION ESTIMATION DEVICE, VEHICLE POSITION ESTIMATION METHOD

TECHNICAL FIELD

The present invention relates to a vehicle position estimation device and a vehicle position estimation method.

BACKGROUND

A conventional technology disclosed in JP 2008-250906 A is a technology in which a mobile robot moving autonomously estimates a vehicle position according to amount of movement and, by matching a passage detected by laser scan with map information acquired in advance, performs correction of the estimated vehicle position. The detected passage and the map information are treated as two-dimensional data when viewed in plan, and, when performing matching between them, only data in a predetermined range from a present location are used.

To detect a target, such as a white line and a curb line, and, by matching the detected target with map information, calculate a vehicle position (absolute coordinates on a map) of a vehicle, a reference point for matching the target with the map information is required. For example, when only a white line extending in a straight line is detected, the white line extending in a straight line, in a traveling direction, serves as a reference point in the vehicle width direction but does not serve as a reference point in the traveling direction, and thus matching with the map information cannot be performed accurately in the traveling direction. Therefore, when a configuration in which only target position data in a predetermined range from the present location are retained is employed, there is a possibility that, when, for example, only data relating to a white line extending in a straight line in the predetermined range from the present location are available, no target position data serving as a reference point in the traveling direction are available, which makes it impossible to obtain an accurate vehicle position of the vehicle. However, retaining all the detected target position data is not practical because doing so causes a required storage capacity to be substantial.

SUMMARY

An object of the present invention is to, while maintaining estimation accuracy of vehicle positions, enable the data amount of target position data to be controlled appropriately.

A vehicle position estimation device according to one aspect of the present invention detects positions of a target present in a periphery of a vehicle and, in conjunction therewith, detects amounts of movements of the vehicle, and stores the positions of the target as target position data, based on the amounts of movements. In addition, the vehicle position estimation device acquires map information including the positions of the target and, by matching the target position data with the positions of the target in the map information, estimates a vehicle position of the vehicle. Further, the vehicle position estimation device detects a turning point of the vehicle from the amounts of movements of the vehicle. Furthermore, the vehicle position estimation device retains at least target position data in a range going back from a present location by a predetermined first set distance and target position data in a range going back from the turning point by a predetermined second set distance.

According to the present invention, since target position data in a range going back from a present location by a first set distance and target position data in a range going back from a turning point by a second set distance are retained, by matching the target position data with map information with the turning point used as a reference point, a vehicle position may be estimated. In addition, since the other target position data do not have to be retained, the data amount of target position data may be controlled appropriately.

DETAILED DESCRIPTION OF THE EMBODIMENTS

An embodiment of the present invention will now be described with reference to the drawings. Note that the drawings are schematic and are sometimes different from actual embodiments. In addition, the following embodiment indicates devices and methods to embody the technical idea of the present invention by way of example and does not limit the configuration to that described below. In other words, the technical idea of the present invention can be subjected to a variety of alterations within the technical scope prescribed by the claims.

First Embodiment

<Configuration>

Figure 1:
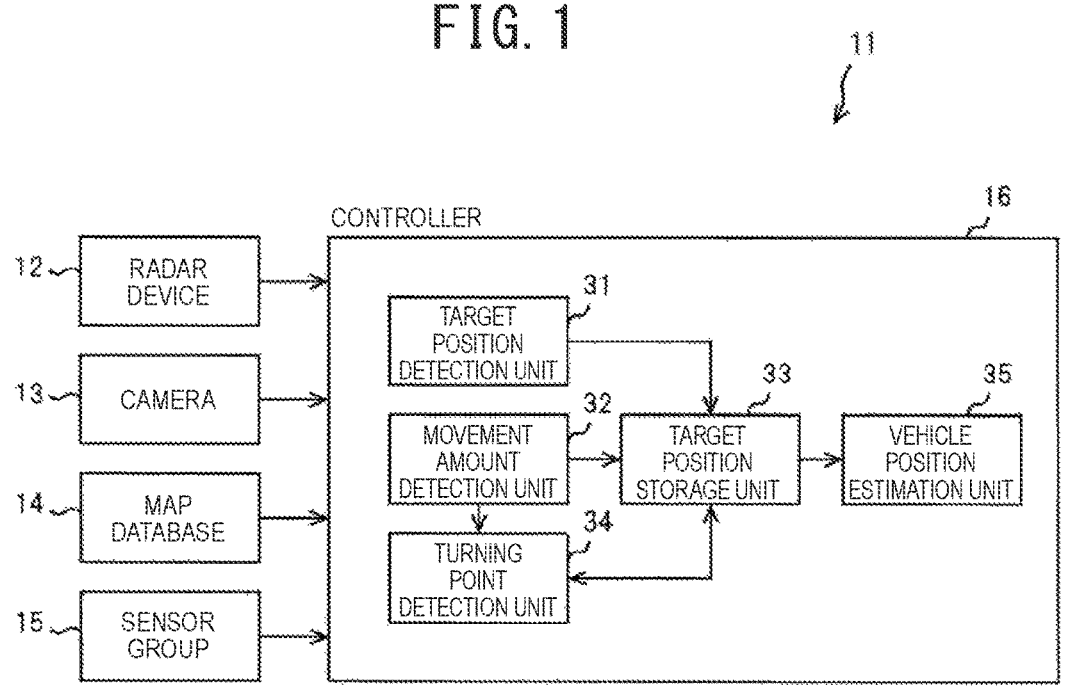
FIG. 1 is a configuration diagram of a vehicle position estimation device.

FIG. 1 is a configuration diagram of a vehicle position estimation device.

A vehicle position estimation device 11 is a device configured to estimate a vehicle position of a vehicle and includes radar devices 12, cameras 13, a map database 14, a sensor group 15, and a controller 16.

Figure 2:
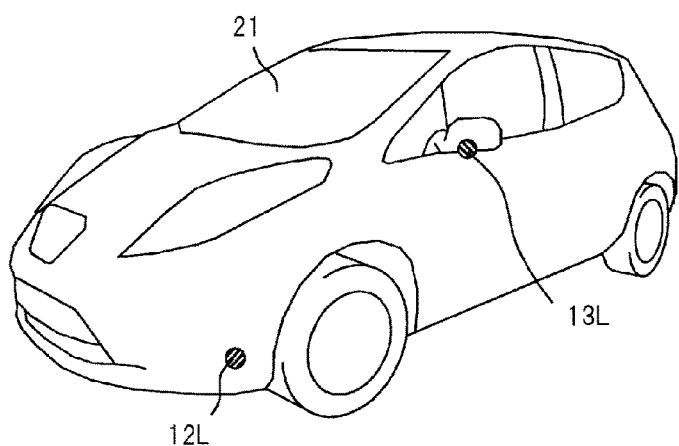
FIG. 2 is a diagram illustrative of an arrangement of radar devices and cameras.
Figure 2:
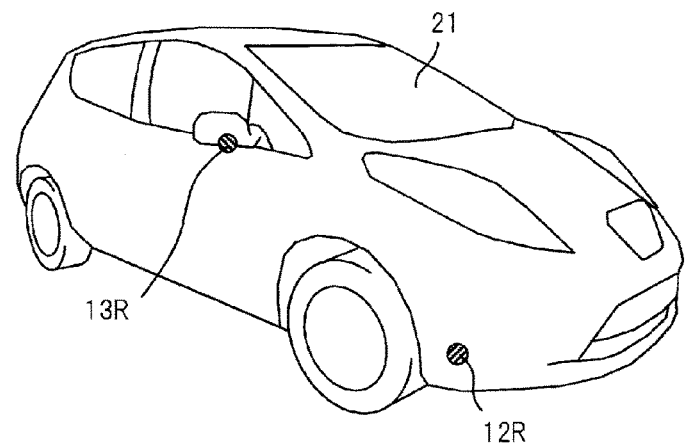

FIG. 2 is a diagram illustrative of an arrangement of the radar devices and the cameras.

Figure 3:
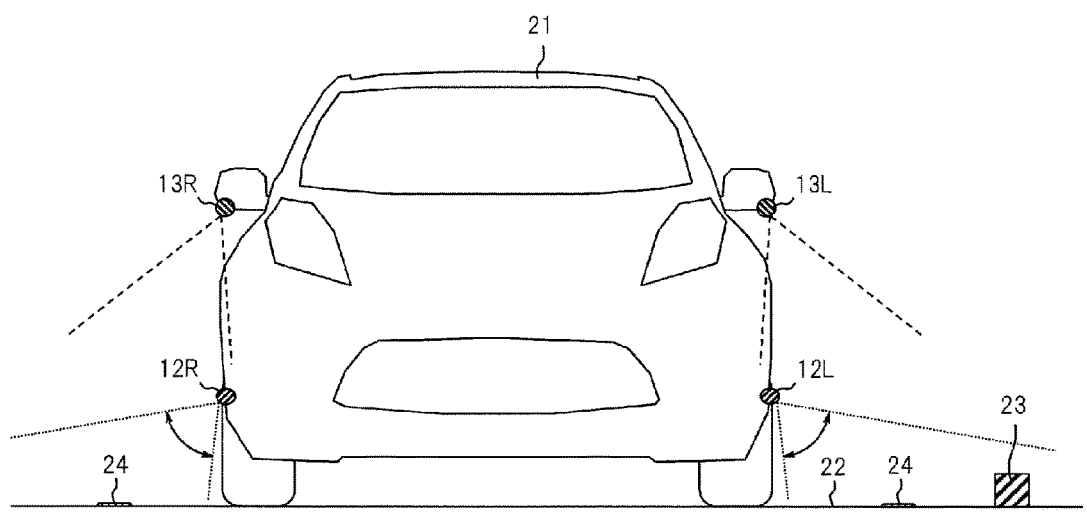
FIG. 3 is a diagram illustrative of scan ranges of the radar devices and imaging ranges of the cameras.

FIG. 3 is a diagram illustrative of scan ranges of the radar devices and imaging ranges of the cameras.

Each radar device 12 has a configuration including, for example, a laser range finder (LRF), measures a distance and a direction to an object that is present laterally to a vehicle 21, and outputs the measured data to the controller 16. The radar devices 12 are disposed at two places in total on the left side surface and the right side surface of the vehicle 21. When the two radar devices 12 are discriminated from each other, the radar devices disposed on the left side surface and the right side surface of the vehicle 21 are referred to as a left side radar device 12L and a right side radar device 12R, respectively. The left side radar device 12L and the right side radar device 12R scan in directions from downward to leftward and in directions from downward to rightward, respectively. In other words, each of the left side radar device 12L and the right side radar device 12R has a rotation axis in the longitudinal direction of the vehicle body and scans in right angle directions to the axis. This operation detects distances and directions to a road surface 22 and a curb 23 present laterally to the body. The curb 23 is provided at a shoulder of a road along a driving lane as a boundary line between a roadway and a sidewalk.

Each camera 13 has a configuration including, for example, a wide angle camera using a charge coupled device (CCD) image sensor, images a lateral side of the vehicle 21, and outputs imaged data to the controller 16. The cameras 13 are disposed at two places in total on a left door mirror and a right door mirror of the vehicle 21. When the two cameras 13 are discriminated from each other, the cameras disposed on the left door mirror and the right door mirror of the vehicle 21 are referred to as a left side camera 13L and a right side camera 13R, respectively. The left side camera 13L and the right side camera 13R image the road surface 22 on the left side and the right side of the vehicle 21, respectively. This operation detects lane markings 24 present laterally to the vehicle body. The lane markings 24 are compartment lines, such as white lines, that are painted on the road surface 22 to mark a driving lane (vehicular lane) that the vehicle 21 is required to travel, and are marked along the driving lane. Note that, although the lane markings 24 are illustrated in three-dimensions for descriptive purposes in FIG. 3, it is assumed that the lane markings 24 are flush with the road surface 22 because the thickness thereof can be regarded as zero in practice.

The map database 14 acquires road map information. In the road map information, position information of the curb 23 and the lane markings 24 is included. Although being an object that has a height, the curb 23 is acquired as two-dimensional data when viewed in plan. The curb 23 and the lane markings 24 are coded into data that are a collection of straight lines, in which each straight line is acquired as position information of both endpoints thereof and a circular arc curve that curves is treated as straight lines that compose a broken line approximating the circular arc curve. Note that the map database 14 may be a storage medium that stores road map information for a vehicle navigation system or may acquire the map information from the outside via a communication system, such as a wireless communication system (road-vehicle communication and inter-vehicle communication are also applicable). In this case, the map database 14 may obtain latest map information periodically and update retained map information. The map database 14 may also accumulate courses that the vehicle has actually traveled as the map information.

The sensor group 15 includes, for example, a GPS receiver, an accelerator sensor, a steering angle sensor, a brake sensor, a vehicle speed sensor, acceleration sensors, wheel speed sensors, a yaw rate sensor, and the like and outputs respective detected data to the controller 16. The GPS receiver acquires present location information of the vehicle 21. The accelerator sensor detects an operation amount of an accelerator pedal. The steering angle sensor detects an operation amount of a steering wheel. The brake sensor detects an operation amount of a brake pedal and pressure inside a brake booster. The vehicle speed sensor detects a vehicle speed. The acceleration sensors detect an acceleration/deceleration in the longitudinal direction and a lateral acceleration of the vehicle. The wheel speed sensors detect wheel speeds of respective wheels. The yaw rate sensor detects a yaw rate of the vehicle.

The controller 16 has a configuration including, for example, an electronic control unit (ECU), which includes a CPU, a ROM, a RAM, and the like, and, in the ROM, a program that executes various types of operation processing, such as vehicle position estimation processing, which will be described later, is recorded. Note that a controller 16 dedicated for the vehicle position estimation processing may be provided or another controller may be configured to also serve as a controller for the vehicle position estimation processing.

The controller 16 includes, as constituent functional blocks, a target position detection unit 31, a movement amount detection unit 32, a target position storage unit 33, a turning point detection unit 34, and a vehicle position estimation unit 35.

The target position detection unit 31 detects positions of targets present in a periphery of a vehicle, such as a curb 23 and lane markings 24, as relative positions with respect to the vehicle in a vehicle coordinate system fixed to the vehicle.

Figure 4:
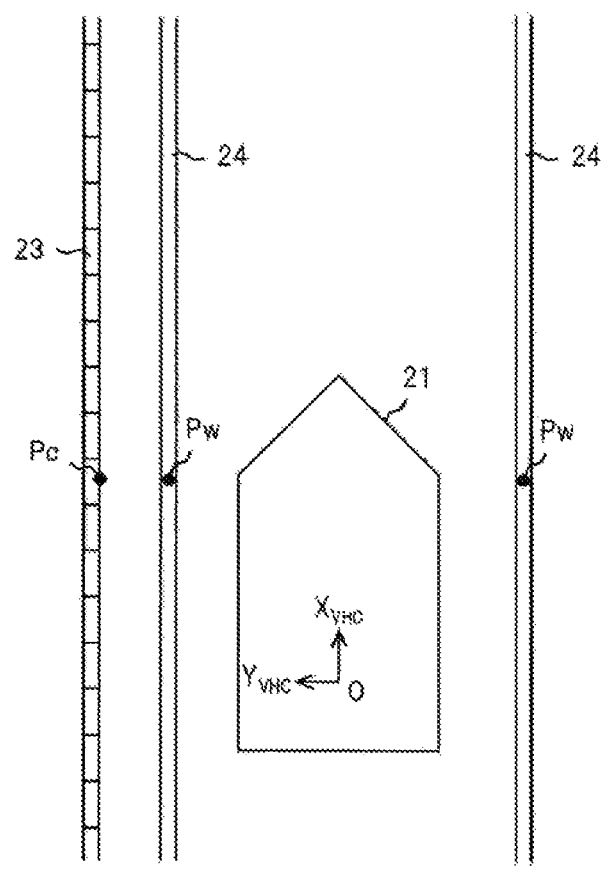
FIG. 4 is a diagram illustrative of a vehicle coordinate system.

FIG. 4 is a diagram illustrative of the vehicle coordinate system.

The vehicle coordinate system is two-dimensional coordinates when viewed in plan, and, for example, the middle of the rear wheel axle, the longitudinal direction, and the right and left directions of the vehicle 21 are assumed to be the origin O, the $X_{VHC}$-axis, and the $Y_{VHC}$-axis, respectively. A formula that converts each of the coordinate systems of the radar devices 12 and the coordinate systems of the cameras 13 to the vehicle coordinate system is obtained in advance. In addition, parameters of the road surface 22 in the vehicle coordinate system are known in advance.

The road surface 22 is laser scanned toward the outer sides in the vehicle width direction by use of the radar devices 12 and a position at which a large change in height (a level difference) is observed by the scan is detected as an endpoint on the roadway side in the width direction of the curb 23. In other words, a position of the curb 23 is detected from three-dimensional data and is projected onto the two-dimensional vehicle coordinate system. In FIG. 4, a detection point of the curb 23 is denoted by Pc and is indicated by a filled rhombus.

By imaging the road surface 22 by use of the cameras 13 and, in imaged gray scale images, extracting patterns in which brightness changes from a dark section to a bright section and from a bright section to a dark section along the right and left directions of the vehicle body, the lane markings 24 are detected. For example, middle points in the width direction of the lane markings 24 are detected. In other words, image data imaged by the cameras 13 are converted by means of bird's eye view conversion into bird's eye view images, from which the lane markings 24 are detected and projected onto the vehicle coordinate system. In FIG. 4, detection points of the lane markings 24 are denoted by Pw and are indicated by filled circles.

The movement amount detection unit 32 detects an odometry that is an amount of movement per unit time of the vehicle 21 from various types of information detected by the sensor group 15. Integration of odometries enables a travel trajectory of the vehicle to be calculated in an odometry coordinate system.

Figure 5:
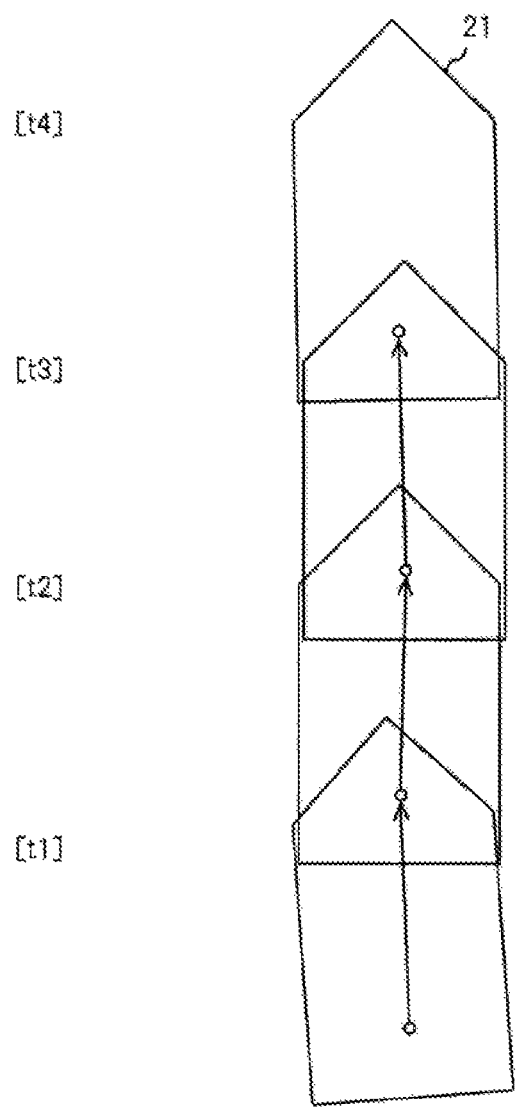
FIG. 5 is a diagram illustrative of an odometry coordinate system.
Figure 5:
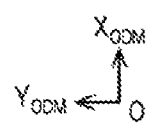

FIG. 5 is a diagram illustrative of the odometry coordinate system.

The odometry coordinate system assumes a position of the vehicle at a point of time when, for example, power for the system is turned on or cut off to be the origin of coordinates and a vehicle body attitude (azimuth) at the point of time to be 0 degrees. By storing three parameters, namely a coordinate position $[X_{ODM}, Y_{ODM}]$ and a vehicle body attitude $[\theta_{ODM}]$, of the vehicle in the odometry coordinate system at each operation cycle, a travel trajectory is detected. In FIG. 5, coordinate positions and vehicle body attitudes of the vehicle at times t1 to t4 are illustrated. Note that, with a present location of the vehicle set to the origin, coordinate conversion of stored target position data may be performed each time. In other words, it may suffice that the target position data are stored in the same coordinate system.

The target position storage unit 33 stores a travel trajectory based on amounts of movements detected by the movement amount detection unit 32 and positions of targets detected by the target position detection unit 31 in association with each other in the odometry coordinate system.

Figure 6:
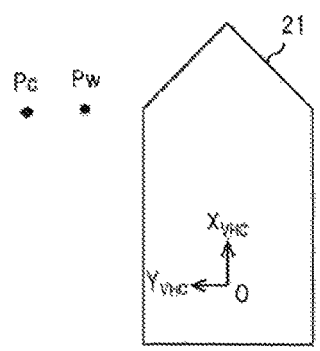
FIG. 6 is a diagram illustrative of target positions in the vehicle coordinate system.
Figure 6:
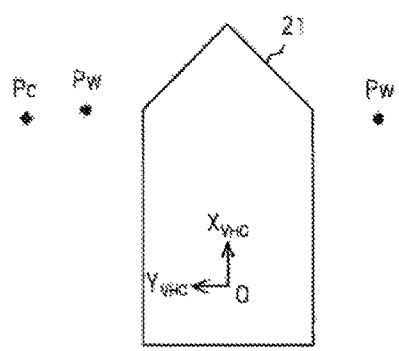
Figure 6:
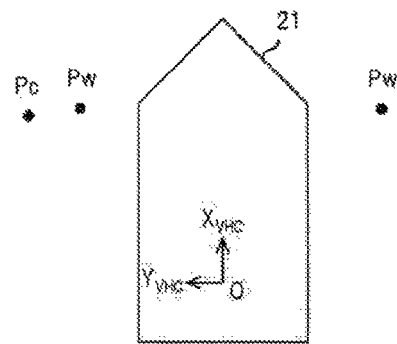
Figure 6:
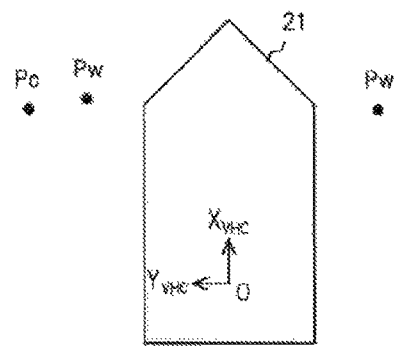

FIG. 6 is a diagram illustrative of target positions in the vehicle coordinate system.

In FIG. 6, positions in the vehicle coordinate system of targets detected by the target position detection unit 31 at the times t1 to t4 are illustrated. As to the targets, detection points Pc of the curb 23, present on the left side of the vehicle 21, detection points Pw of one of the lane markings 24 present on the left side of the vehicle 21, and detection points Pw of the other of the lane markings 24 present on the right side of the vehicle 21 are detected. The positions of the respective targets in the vehicle coordinate system change from moment to moment due to displacement and attitude change of the vehicle 21.

Figure 7:
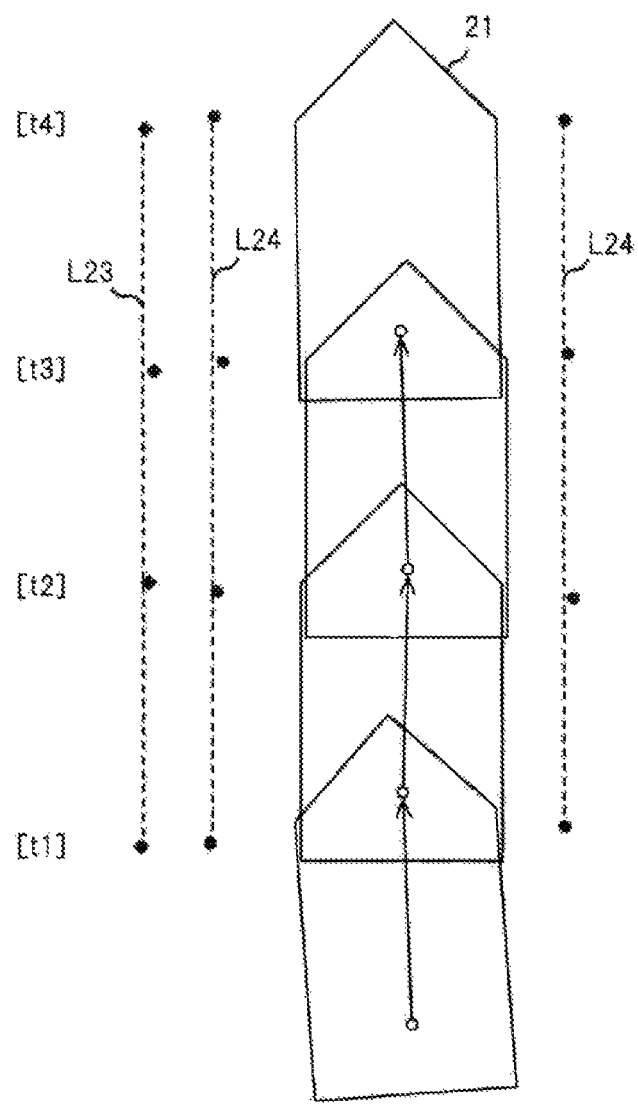
FIG. 7 is a diagram in which a travel trajectory is associated with target positions.

FIG. 7 is a diagram in which a travel trajectory based on amounts of movements of the vehicle is associated with target positions.

In other words, corresponding to the coordinate positions of the vehicle and the vehicle body attitudes at the times t1 to t4, the positions of the targets at the respective times are projected onto the odometry coordinate system. In still other words, at the respective times, the detection points Pc of the curb 23, present on the left side of the vehicle 21, the detection points Pw of one of the lane markings 24 present on the left side of the vehicle 21, and the detection points Pw of the other of the lane markings 24 present on the right side of the vehicle 21 are projected.

The target position storage unit 33 extracts straight lines directed along the driving lane from point groups acquired during a unit time Δt on the targets detected sequentially by the target position detection unit 31. Specifically, optimal parameters a, b, and c in an equation $[aX_{ODM}+bY_{ODM}+c=0]$ representing a straight line are calculated in the odometry coordinate system.

When it is assumed that a unit time Δt is 0.2 seconds, the radar devices 12 operate at 25 Hz, and the cameras 13 operate at 30 Hz, data at five points and data at six points can be acquired with respect to the curb 23 and each lane marking 24, respectively, during the unit time Δt. It is assumed that whether each target is present on the left side or the right side of the vehicle 21 is determined depending on whether the $Y_{VHC}$ coordinate of the target in the vehicle coordinate system is positive or negative. The point group is divided depending on whether each point is positioned on the right side or the left side of the vehicle 21 in this way and subsequently the parameters a, b, and c are calculated.

When the sum of distances between a straight line and respective detection points becomes not less than a threshold value, it is not determined that the straight line is definable. On the other hand, when the sum of distances between a straight line and the respective detection points becomes less than the threshold value, it is determined that the straight line is definable. Two points that provide a maximum length therebetween are chosen out of the detection points that provide a minimum distance to the straight line, and information of the two points is, in conjunction with acquisition times thereof, stored in the target position storage unit 33.

In this case, a straight line L23 is extracted from the detection points Pc, detected at the times t1 to t4, of the curb 23, present on the left side of the vehicle 21. In addition, a straight line L24 is extracted from the detection points Pw, detected at the times t1 to t4, of one of the lane markings 24, present on the left side of the vehicle 21. Further, another straight line L24 is extracted from the detection points Pw, detected at the times t1 to t4, of the other of the lane markings 24, present on the right side of the vehicle 21.

The turning point detection unit 34, referring to a travel trajectory, detects a point at which, going back from a present location Pn, turning angle θt of the vehicle first becomes not smaller than a predetermined set angle θ1 as a turning point Pt1.

The turning angle θt of the vehicle is, in the odometry coordinate system, an amount of attitude change until a present vehicle body attitude is reached and is therefore an angle difference of the vehicle body with a present direction of the vehicle body used as a reference angle. An initial value of the set angle θ1 is, for example, 60 degrees. However, the set angle θ1 is configured to be variable according to the lengths of straight lines extracted by the target position storage unit 33.

In other words, when, going back from the present location, the driving lane is a straight line and as straight-line distance L of the driving lane increases, the set angle θ1 is made smaller. The straight-line distance L is obtained by, for example, referring to a set of straight lines extracted by the target position storage unit 33 and determining how far, going back from the present location, the straight lines are considered to belong to an identical straight line. When the straight-line distance L is long, a target serving as a reference point in the vehicle width direction is available in a traveling direction but a target serving as a reference point in the traveling direction is, going back from the present location, located far and cumulative error in odometries increases, which causes estimation accuracy of vehicle positions to deteriorate. In such a case, making the set angle θ1 smaller as the straight-line distance L increases facilitates detection of even a gentler turn as a turning point Pt1, and facilitating detection of a turning point Pt1 at a point that is, going back from the present location, closer to the present location may further facilitates retention of a target serving as a reference point in the traveling direction.

Figure 8:
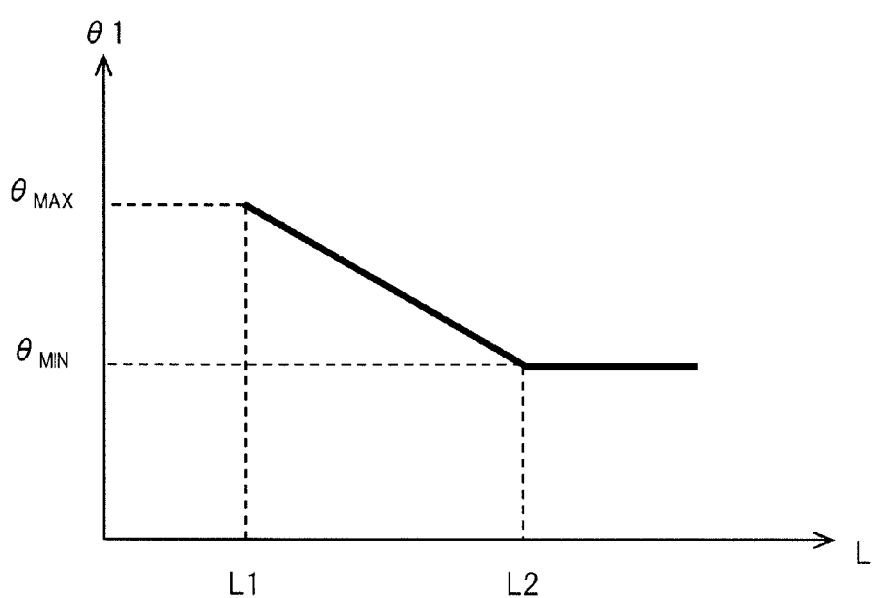
FIG. 8 is a map used for setting of a set angle θ1 according to straight-line distance L.

FIG. 8 is a map used for setting of the set angle θ1 according to the straight-line distance L.

The abscissa and the ordinate of the map represent the straight-line distance L and the set angle θ1, respectively. As to the straight-line distance L, a value L1 that is greater than 0 and a value L2 that is greater than L1 are determined in advance. As to the set angle θ1, a value $\theta_{MIN}$ that is greater than 0 and a value $\theta_{MAX}$ that is greater than $\theta_{MIN}$ are determined in advance. The value $\theta_{MAX}$ and the value $\theta_{MIN}$ are, for example, 60 degrees and 30 degrees, respectively. When the straight-line distance L is in a range from L1 to L2, the greater the straight-line distance L is, the smaller becomes the set angle θ1 within a range from $\theta_{MAX}$ to $\theta_{MIN}$. In addition, when the straight-line distance L is not less than L2, the set angle θ1 is kept at $\theta_{MIN}$.

Figure 9:
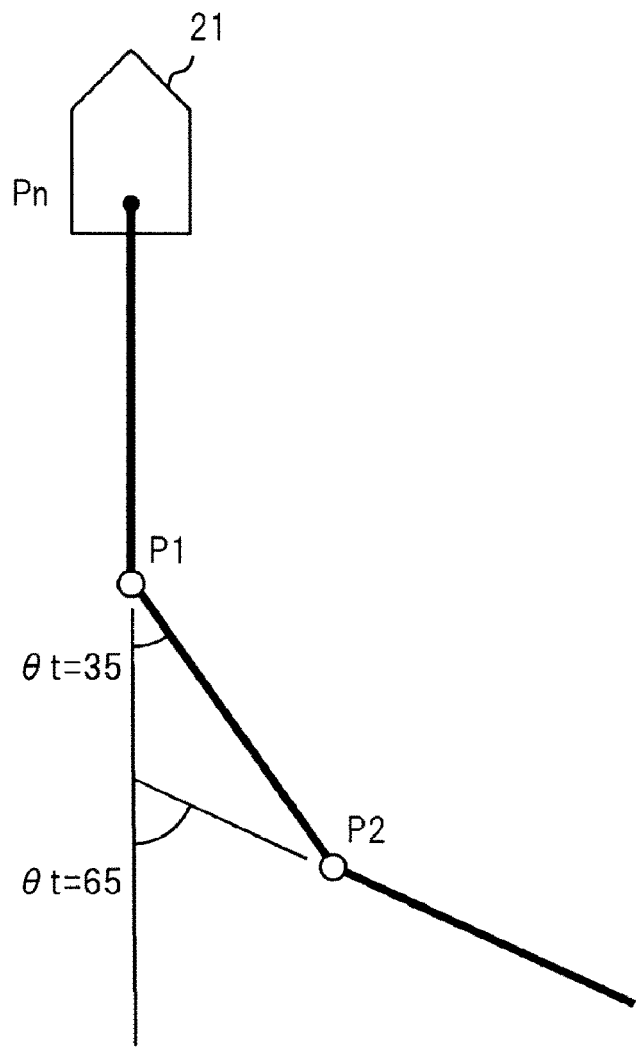
FIG. 9 is a diagram descriptive of setting of a turning point Pt1.

FIG. 9 is a diagram descriptive of setting of a turning point Pt1.

It is assumed that points P1 and P2 are located in a region reached by going back from the present location Pn and the turning angle θt at the point P1 and the turning angle θt at the point P2 are 35 degrees and 65 degrees, respectively. Therefore, when the set angle θ1 is 60 degrees, a point at which, going back from the present location Pn, the turning angle θt first becomes not smaller than the set angle θ1 is the point P2, and the point P2 is detected as the turning point Pt1. In addition, when the set angle θ1 is 30 degrees, a point at which, going back from the present location Pn, the turning angle θt first becomes not smaller than the set angle θ1 is the point P1, and the point P1 is detected as the turning point Pt1. Note that both points may be set as turning points in such a way that the point P1 and the point P2 are set as the turning point Pt1 and a turning point Pt2, respectively. In other words, it may suffice that target position data in a peripheral range of the present vehicle position of the vehicle and in a set distance range preceding a turning point are configured to be retained.

There is a possibility that a point at which the turning angle θt becomes not smaller than the set angle θ1 is detected because of a meandering such as the one occurring when avoiding an obstacle, and thus a turning point may be configured to be obtained using an average turning angle $\theta t_{AVE}$.

First, a point at which the turning angle θt becomes not smaller than the set angle θ1 is chosen as a turning point candidate Pp, and an average turning angle $\theta t_{AVE}$ over a predetermined set section centering around the turning point candidate Pp is calculated. The set section is a section that has distances each as long as a predetermined value α in front and rear of a turning point candidate Pp, that is, a section from a point [Pp−α] to a point [Pp+α]. The predetermined α is, for example, 10 m.

When the average turning angle $\theta t_{AVE}$ is not smaller than a predetermined set angle θ2, the vehicle 21 is determined to be turning, and the turning point candidate Pp is detected as the final turning point Pt1. The set angle θ2 is, for example, 5 degrees. On the other hand, when the average turning angle $\theta t_{AVE}$ is smaller than the set angle θ2, the vehicle 21 is determined to be meandering, and the turning point candidate Pp is excluded from the candidates and in conjunction therewith, further going back, a next turning point candidate Pp is searched for.

Figure 10A:
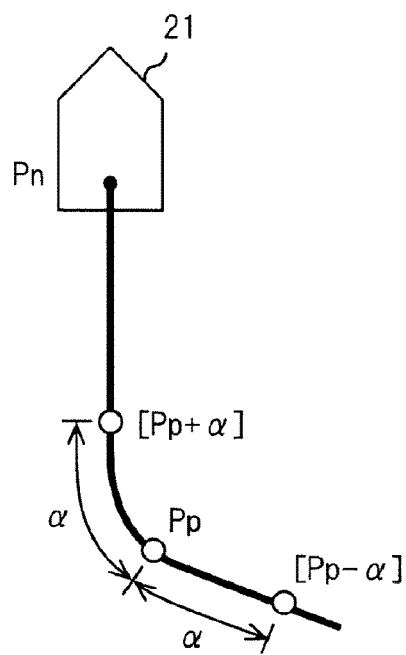
FIGS. 10A and 10B are diagrams descriptive of meandering judgment.
Figure 10B:
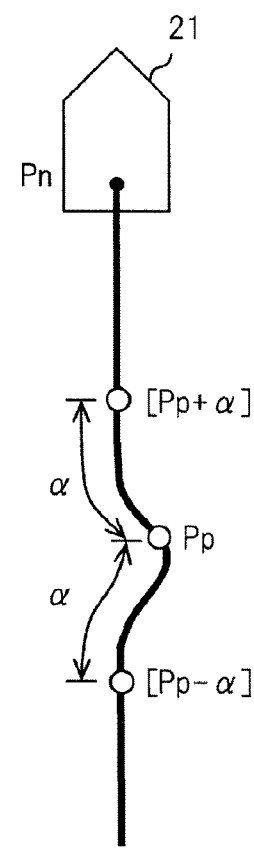

FIGS. 10A and 10B are diagrams descriptive of meandering judgment.

FIG. 10A illustrates a case where a turning point candidate Pp is chosen because of a turn performed by the vehicle and FIG. 10B illustrates a case where a turning point candidate Pp is chosen because of a meandering performed by the vehicle, respectively. Performing the above-described meandering judgment causes the turning point candidate Pp to be detected as the final turning point Pt1 in the case of FIG. 10A and to be excluded from the candidates in the case of FIG. 10B, respectively.

The target position storage unit 33 retains target position data in a range going back from the present location Pn by a predetermined distance D1 to a point [Pn-D1] and in a range going back from the turning point Pt1 by a predetermined set distance D2 to a point [Pt1-D2]. On the other hand, the other target position data, that is, target position data in a range from the point [Pn-D1] to the turning point Pt1 and target position data at and preceding the point [Pt1-D2], are deleted or thinned out. Depending on an amount of data that can be stored in the target position storage unit 33, not all the data need to be deleted, and it may suffice that stored data amount is controlled by, for example, configuring target position data thinned out at a predetermined space interval to be stored. The set distance D1 is, for example, 20 m. An initial value of the set distance D2 is, for example, 20 m.

Figure 11:
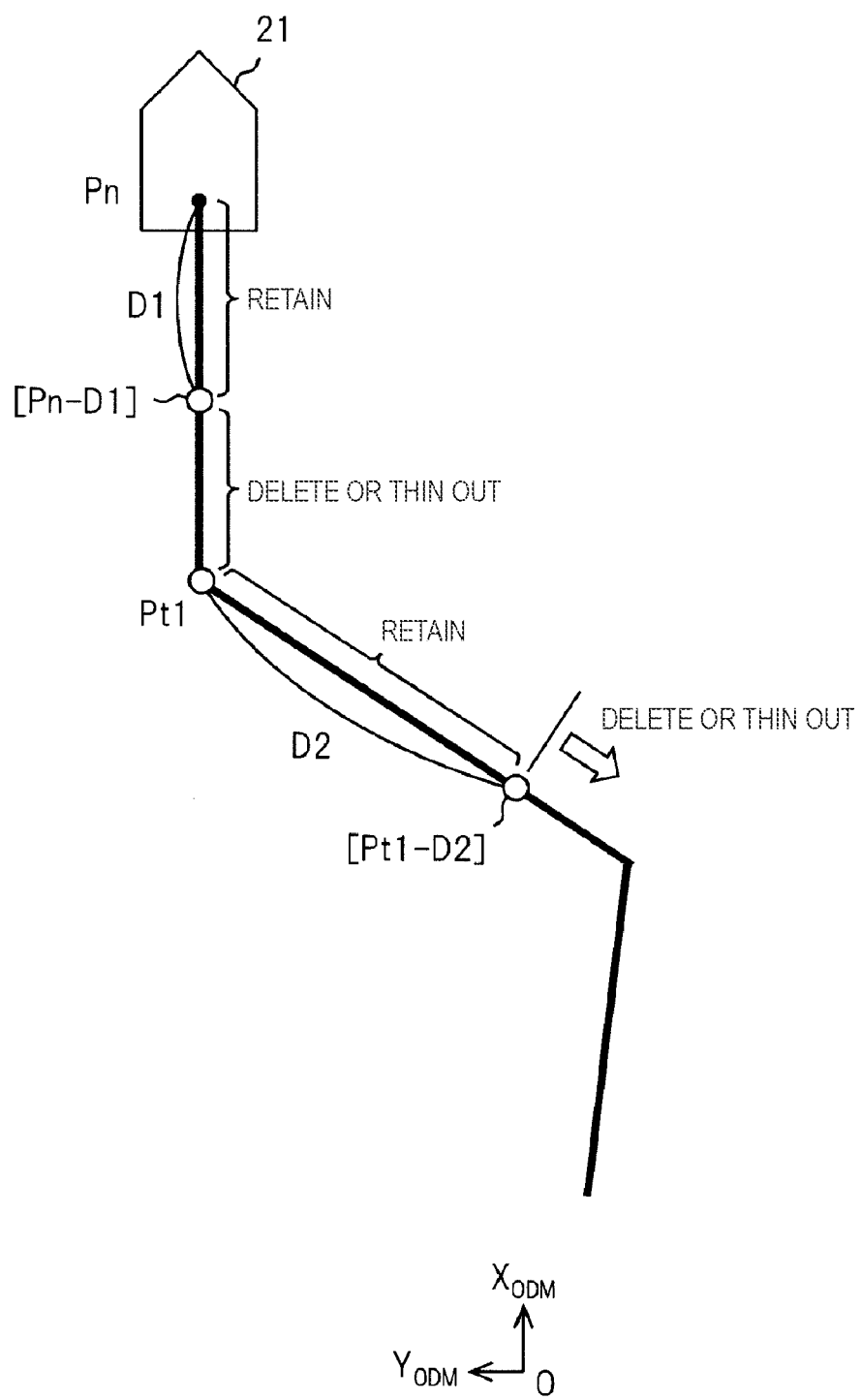
FIG. 11 is a diagram illustrative of sections for which target position data are retained and sections for which target position data are deleted or thinned out.

FIG. 11 is a diagram illustrative of sections for which target position data are retained and sections for which target position data are deleted or thinned out.

As to the set distance D2, the set distance D2 is made longer as the number N of targets relating to the curb 23, the lane markings 24, and the like decreases that the target position detection unit 31 was able to detect in a range going back from the turning point Pt1 by the set distance D2. Making the set distance D2 longer as the number N of targets decreases in this way facilitates securing the number N of targets.

Figure 12:
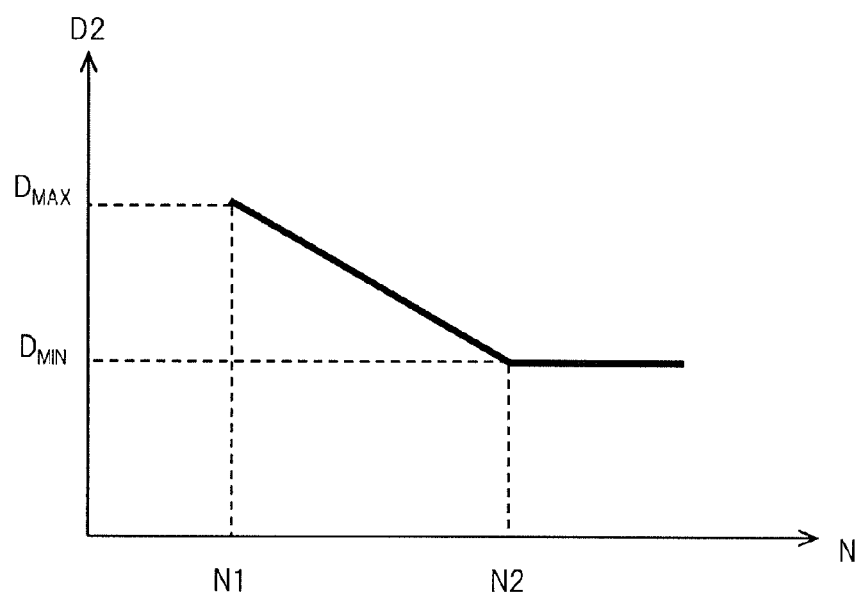
FIG. 12 is a map used for setting of a set distance D2 according to the number N of targets.

FIG. 12 is a map used for setting of the set distance D2 according to the number N of targets.

The abscissa and the ordinate of the map represent the number N of targets and the set distance D2, respectively. As to the number N of targets, a value N1 that is greater than 0 and a value N2 that is greater than N1 are determined in advance. As to the set distance D2, a value $D_{MIN}$ that is greater than 0 and a value $\theta_{MAX}$ that is greater than $D_{MIN}$ are determined in advance. The value $D_{MIN}$ and the value $D_{MAX}$ are, for example, 20 m and 40 m, respectively. Although being the number of detection points, the number N of targets may be converted into a cumulative length of straight lines. When the number N of targets is not less than N2, the set distance D2 is kept at $D_{MIN}$. In addition, when the number N of targets is in a range from N2 to N1, the less the number N of targets is, the longer becomes the set distance D2 within a range from $D_{MIN}$ to $D_{MAX}$.

The target position storage unit 33 uniformly (automatically) and successively deletes target positions preceding a point [Pn-D3] reached by going back from the present location Pn by a predetermined set distance D3.

Figure 13:
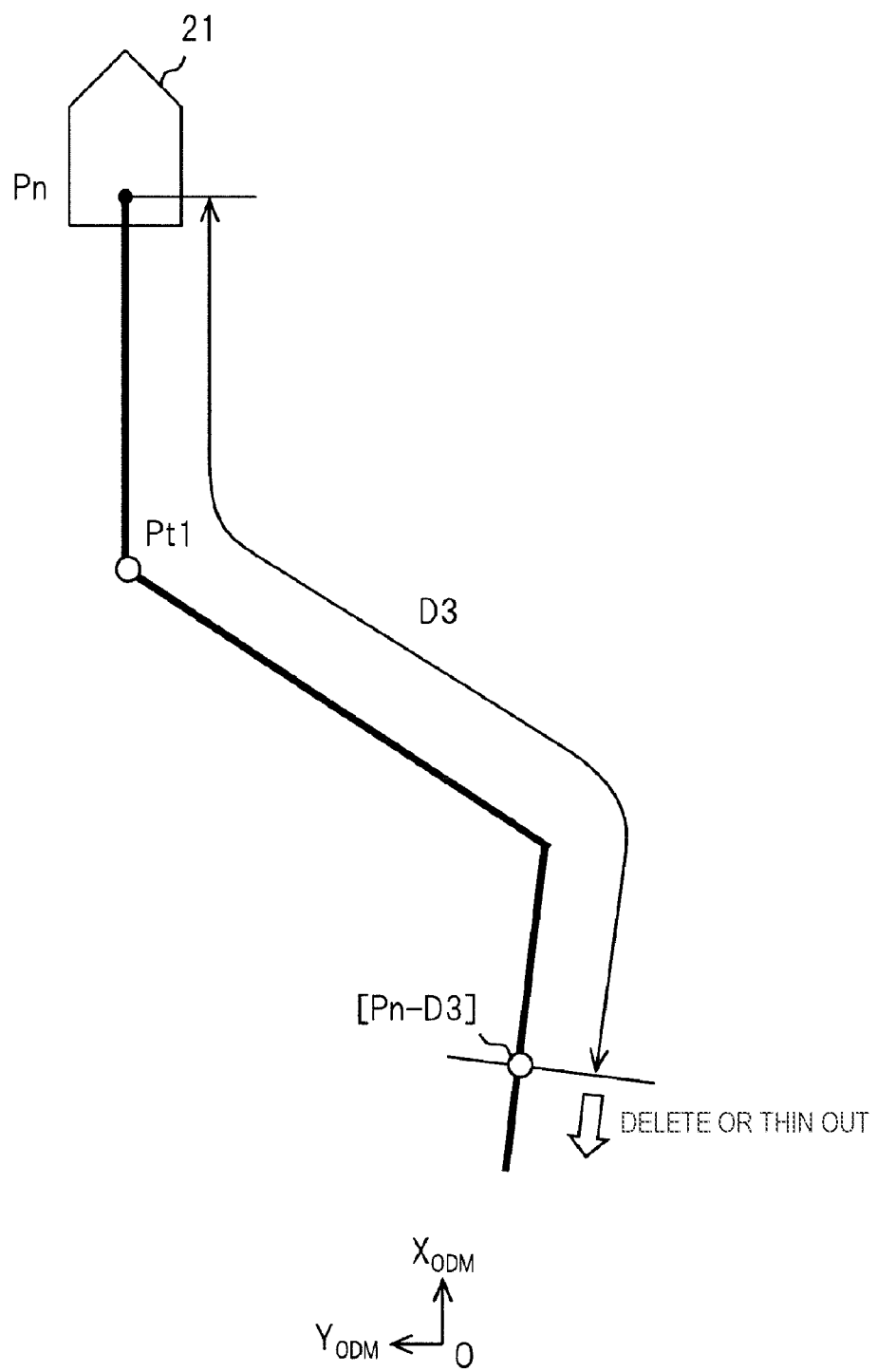
FIG. 13 is a diagram illustrative of a set distance D3.

FIG. 13 is a diagram illustrative of the set distance D3.

Since, as the travel distance increases, cumulative error in a travel trajectory detected in the odometry coordinate system becomes larger and influences vehicle position estimation, the set distance D3 is set as a distance at which cumulative error is likely to increase and, for example, is set at 100 m. Thus, even when the turning point Pt1 resides at a point preceding the point [Pn-D3], target position data at points preceding the point [Pn-D3] are configured to be deleted or thinned out.

The vehicle position estimation unit 35, by matching target position data stored in the target position storage unit 33 with map information stored in the map database 14, estimates a vehicle position of the vehicle 21 in a map coordinate system.

The map coordinate system is a two-dimensional coordinate system when viewed in plan, and it is assumed that the east-west direction and the north-south direction correspond to the $X_{MAP}$-axis and the $Y_{MAP}$-axis, respectively. The vehicle body attitude (azimuth) is represented by counterclockwise angle with 0 degrees being due east. In the map coordinate system, three parameters, namely a coordinate position [$X_{MAP}$, $Y_{MAP}$] and a vehicle body attitude [$\theta_{MAP}$] of the vehicle, are estimated. For the matching (map matching), for example, an iterative closest point (ICP) algorithm is used. When straight lines are matched with each other in the matching, the endpoints at both ends of the straight lines are matched with each other as evaluation points, and, when the space between the endpoints at both ends is wide, points in the space may be interpolated.

Next, vehicle position estimation processing that the controller 16 performs at each predetermined interval (for example, 10 msec) will be described.

Figure 14:
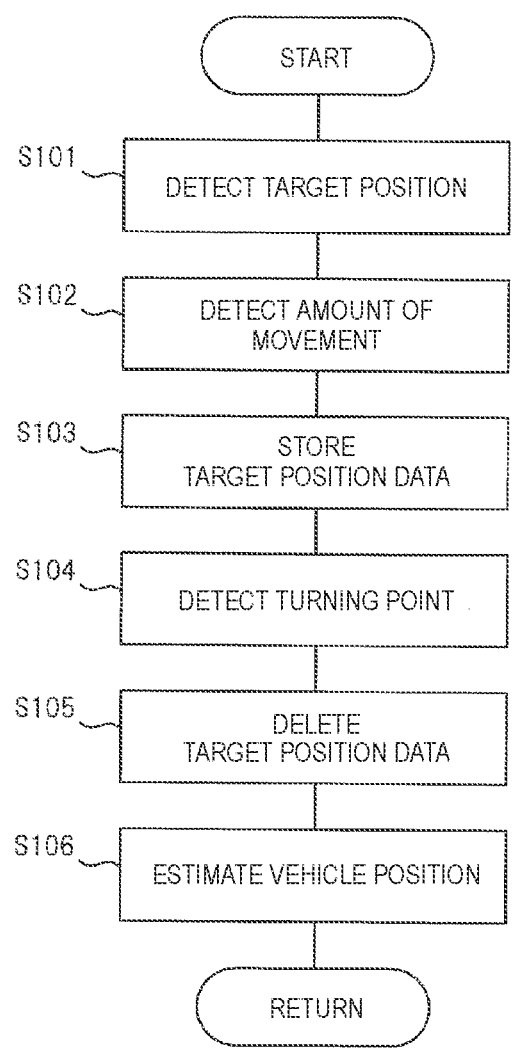
FIG. 14 is a flowchart illustrative of vehicle position estimation processing.

FIG. 14 is a flowchart illustrative of the vehicle position estimation processing.

First, step S101 corresponds to processing performed by the target position detection unit 31, in which positions of targets present in a periphery of the vehicle, such as a curb 23 and lane markings 24, are detected as relative positions with respect to the vehicle in the vehicle coordinate system fixed to the vehicle. In other words, detection points Pc of the curb 23 detected by the radar devices 12 and detection points Pw of the lane markings 24 detected by the cameras 13 are detected in the vehicle coordinate system.

The succeeding step S102 corresponds to processing performed by the movement amount detection unit 32, in which odometries each of which is an amount of movement per unit time of the vehicle 21 are detected from various types of information detected by the sensor group 15. Integration of the odometries enables a travel trajectory of the vehicle to be calculated in the odometry coordinate system. In other words, three parameters, namely a coordinate position [$X_{ODM}$, $Y_{ODM}$] and a vehicle body attitude [$\theta_{ODM}$], of the vehicle are stored in the odometry coordinate system at each operation cycle.

The succeeding step S103 corresponds to processing performed by the target position storage unit 33, in which the travel trajectory based on the amounts of movements detected by the movement amount detection unit 32 and the positions of the targets detected by the target position detection unit 31 are stored in association with each other in the odometry coordinate system. In other words, target position data detected at respective points of time are moved by amounts of movements of the vehicle during elapsed times from the respective points of time to the present point of time, and, corresponding to the coordinate positions and vehicle body attitudes of the vehicle at the respective points of time, the respective target position data of the curb 23, the lane markings 24, and the like are projected onto the odometry coordinate system and stored. However, target position data at points preceding a point [Pn-D3] reached by going back from the present location Pn by the predetermined set distance D3 are uniformly and successively deleted.

The succeeding step S104 corresponds to processing performed by the turning point detection unit 34, in which, referring to the travel trajectory, a point at which, going back from the present location Pn, the turning angle θt of the vehicle first becomes not smaller than the set angle θ1 is detected as a turning point Pt1. In the above processing, when, going back from the present location Pn, the driving lane is a straight line and as straight-line distance L of the driving lane increases, the set angle θ1 is made smaller.

In addition, after meandering judgment is performed, a final turning point Pt1 is determined. In other words, a point at which the turning angle θt becomes not smaller than the set angle θ1 is chosen as a turning point candidate Pp, and an average turning angle $\theta t_{AVE}$ over a set section centering around the turning point Pp from a point [Pp+α] to a point [Pp−α] is calculated. When the average turning angle $\theta t_{AVE}$ is not smaller than a set angle θ2, the vehicle 21 is determined to be turning, and the turning point candidate Pp is detected as the final turning point Pt1. On the other hand, the average turning angle $\theta t_{AVE}$ is smaller than the set angle θ2, the vehicle 21 is determined to be meandering, and the turning point candidate Pp is excluded from the candidates and in conjunction therewith, further going back, a next turning point candidate Pp is searched for.

The succeeding step S105 corresponds to processing performed by the target position storage unit 33, in which target position data in a range going back from the present location Pn to the predetermined distance D1 and in a range going back from the turning point Pt1 by the set distance D2 to a point [Pt1-D2] are retained and the other target position data are deleted or thinned out. In the above processing, as to the set distance D2, the set distance D2 is made longer as the number N of targets relating to the curb 23, the lane markings 24, and the like decreases that the target position detection unit 31 was able to detect in the range going back from the turning point Pt1 by the set distance D2.

The succeeding step S106 corresponds to processing performed by the vehicle position estimation unit 35, in which, by matching target position data stored in the target position storage unit 33 with map information stored in the map database 14, a vehicle position of the vehicle 21 in the map coordinate system is estimated. In other words, in the map coordinate system, three parameters, namely a coordinate position [$X_{MAP}$, $Y_{MAP}$] and a vehicle body attitude [$\theta_{MAP}$] of the vehicle, are estimated.

The above is a description of the vehicle position estimation processing.

<Operation>

First, a technological concept of the first embodiment will be described.

By matching positions of targets, such as a curb 23 detected by the radar devices 12 and lane markings 24 detected by the cameras 13, with positions of the respective targets coded into data as map information in advance, a vehicle position of the vehicle 21 is estimated. The present embodiment exemplifies a method in which the map information is created using only targets, such as the curb 23 and the lane markings 24, the detection of which is comparatively easier than other targets and that can be described as two-dimensional data when viewed in plan and, using the map information, estimation of a vehicle position is performed. Note that, when a higher estimation accuracy of vehicle positions is to be attained, map information having three-dimensional (length, width, and height) data of structures may be used. The present embodiment may also be applied to this case.

Since, when, in a straight line section of a target, such as the curb 23 and the lane markings 24, arbitrary points on the target are detected, target position data extending in a straight line serve as, in the traveling direction, a reference point in the vehicle width direction but do not serve as a reference point in the traveling direction, the target position data cannot be matched with the map information accurately in the traveling direction. In other words, when only target position data characterized by a straight line extending in a straight line are available, target position data serving as a reference point in the traveling direction become unavailable, which makes it impossible to obtain a vehicle position uniquely. Therefore, in order to obtain a vehicle position uniquely, at least a combination of two straight lines intersecting each other is required.

Since only straight line shaped targets can be detected on a straight road, target position data enabling a vehicle position to be obtained uniquely cannot be acquired by only performing sensing from a present location. Thus, storing a certain amount of past target position data in the odometry coordinate system by use of movement amount information of the vehicle 21 and matching the odometry coordinate system onto which the target position data are projected with the map coordinate system in which target positions are stored in advance enable a vehicle position to be estimated. However, in the odometry coordinate system, there is a problem in that the longer travel distance is, the larger becomes cumulative error. In addition, since storing detected target positions and travel trajectories based on amounts of movements of the vehicle boundlessly is not practical, old target position data are required to be sequentially deleted in chronological order. However, a simple configuration such as, for example, retaining only target position data in a predetermined range from the present location causes only target position data on a straight line to be kept retained for a straight road extending in a straight line.

Figure 15A:
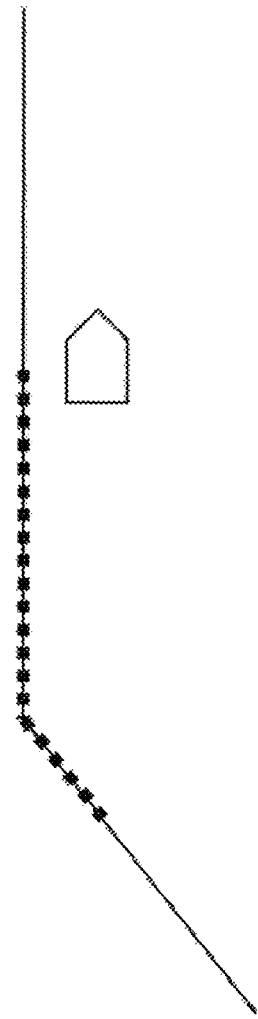
FIGS. 15A and 15B are diagrams illustrative of retaining only target position data within a predetermined range.

FIG. 15A are diagrams illustrative of retaining only target position data within a predetermined range.

Figure 15B:
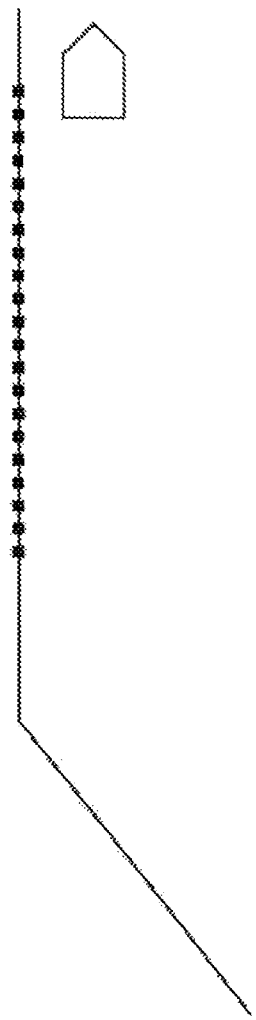

In FIGS. 15A and 15B, a case where only target position data of targets present within a predetermined range from the present location are retained is illustrated, and sections where target position data therein are retained are indicated by thick dotted lines. FIG. 15A illustrates a situation at a point of time not long after the vehicle passed a curve, in which target position data before the vehicle entering the curve are also retained. In other words, since a combination of two straight lines intersecting each other is successfully detected, a vehicle position can be obtained uniquely. On the other hand, in FIG. 15B, the vehicle having further proceeded forward has caused target position data before the vehicle entering the curve to be deleted. In other words, since no two straight lines intersecting each other are detected and only one straight line is detected, it is impossible to obtain a vehicle position uniquely.

Therefore, it is required to detect a point at which the vehicle turned out of the travel trajectory and to save target position data at points preceding the point.

Figure 16A:
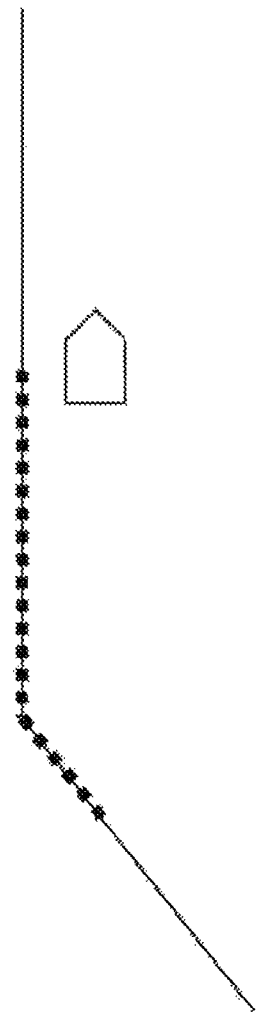
FIGS. 16A and 16B are diagrams illustrative of a concept of an embodiment.
Figure 16B:
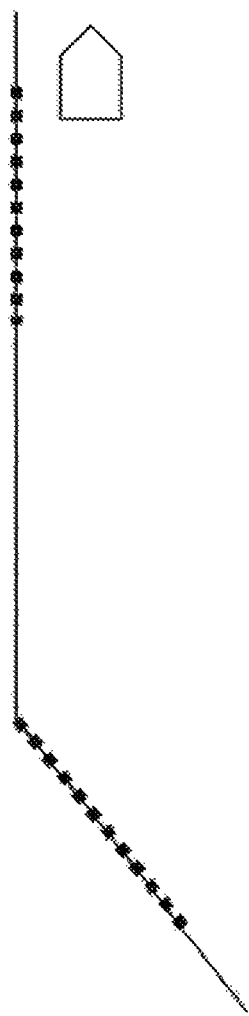

FIGS. 16A and 16B are diagrams illustrative of a concept of the embodiment.

In FIGS. 16A and 16B, sections where target position data therein are retained are indicated by thick dotted lines. FIG. 16A illustrates a situation at a point of time not long after the vehicle passed a curve, in which target position data before the vehicle entering the curve are also retained. In other words, since a combination of two straight lines intersecting each other is successfully detected, a vehicle position can be obtained uniquely. In addition, in part FIG. 16B, although the vehicle has further proceeded forward, target position data in a range going back from the present location of the vehicle by a predetermined distance and target position data before the vehicle entering the curve are retained. In other words, since a combination of two straight lines intersecting each other is successfully detected, it is possible to obtain a vehicle position uniquely.

Next, an operation of the first embodiment will be described.

First, positions of targets present in a periphery of the vehicle, such as a curb 23 and lane markings 24, are detected as relative positions with respect to the vehicle in the vehicle coordinate system fixed to the vehicle (step S101), and odometries each of which is an amount of movement per unit time of the vehicle 21 are detected from various types of information detected by the sensor group 15 and, by integrating the odometries, a travel trajectory of the vehicle is calculated in the odometry coordinate system (step S102). In addition, the detected travel trajectory based on amounts of movements and the detected positions of targets are stored in association with each other in the odometry coordinate system (step S103).

Based on the travel trajectory, a point at which turning angle θt of the vehicle becomes not smaller than a predetermined set angle θ1 is detected as a turning point Pt1 (step S104). Target position data in a range going back from the present location Pn to a predetermined distance D1 and in a range going back from the turning point Pt1 by a set distance D2 to a point [Pt1-D2] are retained, and the other target position data are deleted or thinned out (step S105). By matching target position data stored in the target position storage unit 33 with map information stored in the map database 14, a vehicle position of the vehicle 21 in the map coordinate system is estimated (step S106).

Since, as described above, the target position data in the range going back from the present location Pn to the set distance D1 and in the range going back from the turning point Pt1 by the set distance D2 to a point [Pt1-D2] are retained, by matching the target position data with the map information with the turning point Pt1 used as a reference point, a vehicle position may be estimated uniquely. In addition, since target position data at the other points, including points in a range [D1-Pt1] and points preceding the point [Pt1-D2], are deleted or thinned out, an increase in the data amount of target position data may be suppressed and controlled appropriately. Further, in the odometry coordinate system, an increase in cumulative error in odometries and an influence thereof on estimation accuracy of vehicle positions may be suppressed.

There is a possibility that, when the driving lane is a straight line and as the straight-line distance L thereof increases, the cumulative error in odometries increases. Thus, when, going back from the present location Pn, the driving lane is a straight line and as the straight-line distance L thereof increases, the set angle θ1 is made smaller. In other words, making the set angle θ1 smaller as the straight-line distance L increases facilitates detection of a turning point Pt1 at a point that is, going back from the present location, closer to the present location, which may further facilitate retention of a target serving as a reference point in the traveling direction. Detection of a turning point Pt1 at a closer point in the travel trajectory enables the data amount of target position data to be stored to be reduced. In addition, cumulative error in the odometry coordinate system may be reduced, and a decrease in estimation accuracy of vehicle positions may be suppressed.

To improve the estimation accuracy of vehicle positions, it is preferable that the sufficient number N of targets be available even in the range going back from the turning point Pt1 by the set distance D2. Thus, the set distance D2 is made longer as the number N of targets relating to the curb 23, the lane markings 24, and the like decreases that the target position detection unit 31 was able to detect in the range going back from the turning point Pt1 by the set distance D2. Since, as described above, extension of the set distance D2 according to the number N of targets enables the necessary and sufficient number N of targets to be secured while preventing the data amount of target position data from increasing more than necessary, the estimation accuracy of vehicle positions may be secured.

In detecting a turning point Pt1, there is a possibility that, even when being a point at which the turning angle θt becomes not smaller than the set angle θ1, a point is detected because of a meandering travel. False detection of a point as a turning point Pt1 because of a meandering travel is liable to influence the estimation accuracy of vehicle positions. Thus, after meandering judgment has been performed, a final turning point Pt1 is determined. Specifically, a point at which the turning angle θt becomes not smaller than the set angle θ1 is chosen as a turning point candidate Pp, and an average turning angle $θt_{AVE}$ over a set section centering around the turning point Pp, that is, a section from a point [Pp+α] to a point [Pp−α], is calculated.

When the average turning angle $θt_{AVE}$ is not smaller than a set angle θ2, the vehicle 21 is determined to be turning, and the turning point candidate Pp is detected as the final turning point Pt1. On the other hand, when the average turning angle $θt_{AVE}$ is smaller than the set angle θ2, the vehicle 21 is determined to be meandering, and the turning point candidate Pp is excluded from the candidates and in conjunction therewith, further going back, a next turning point candidate Pp is searched for. The above configuration enables false determinations because of a meandering travel to be reduced and the turning point Pt1 to be judged easily and accurately. Therefore, influence on the estimation accuracy of vehicle positions may be suppressed.

The turning angle θt is detected based on changes in the traveling direction of a vehicle. Specifically, an angle difference of the vehicle body when a present direction of the vehicle body is used as a reference angle is detected. The above configuration enables influence from cumulative error in the odometry coordinate system and influence from changes in attitude as in a case of avoiding an obstacle to be reduced and the turning angle θt to be detected accurately.

In addition, at the stage when a travel trajectory and positions of targets are stored in association with each other (step S103), target position data at points preceding a point [Pn−D3] reached by going back from the present location Pn by a predetermined set distance D3 are successively deleted. The above configuration enables an increase in the data amount of target position data to be suppressed.

Application Example 1

Although, in the first embodiment, target position data at points preceding a point [Pt1−D2] are deleted or thinned out, the present invention is not limited to the configuration. For example, in a range going back from the turning point Pt1 by the set distance D2, a point at which the turning angle θt of the vehicle becomes not smaller than the set angle θ1 is detected as a turning point Pt2. On this basis, target position data in a range from the present location Pn to the set distance D1 and in a range from the turning point Pt1 to the turning point Pt2 are retained. On the other hand, target position data at the other points, including points in a range [D1-Pt1] and points preceding the turning point Pt2, are deleted or thinned out. Note that it may suffice that at least one reference point required in matching the target position data with the map information is included. Since inclusion of the turning point Pt1 in the target position data retained as target position data suffices the requirement, the turning point Pt2 may be deleted or thinned out.

Figure 17:
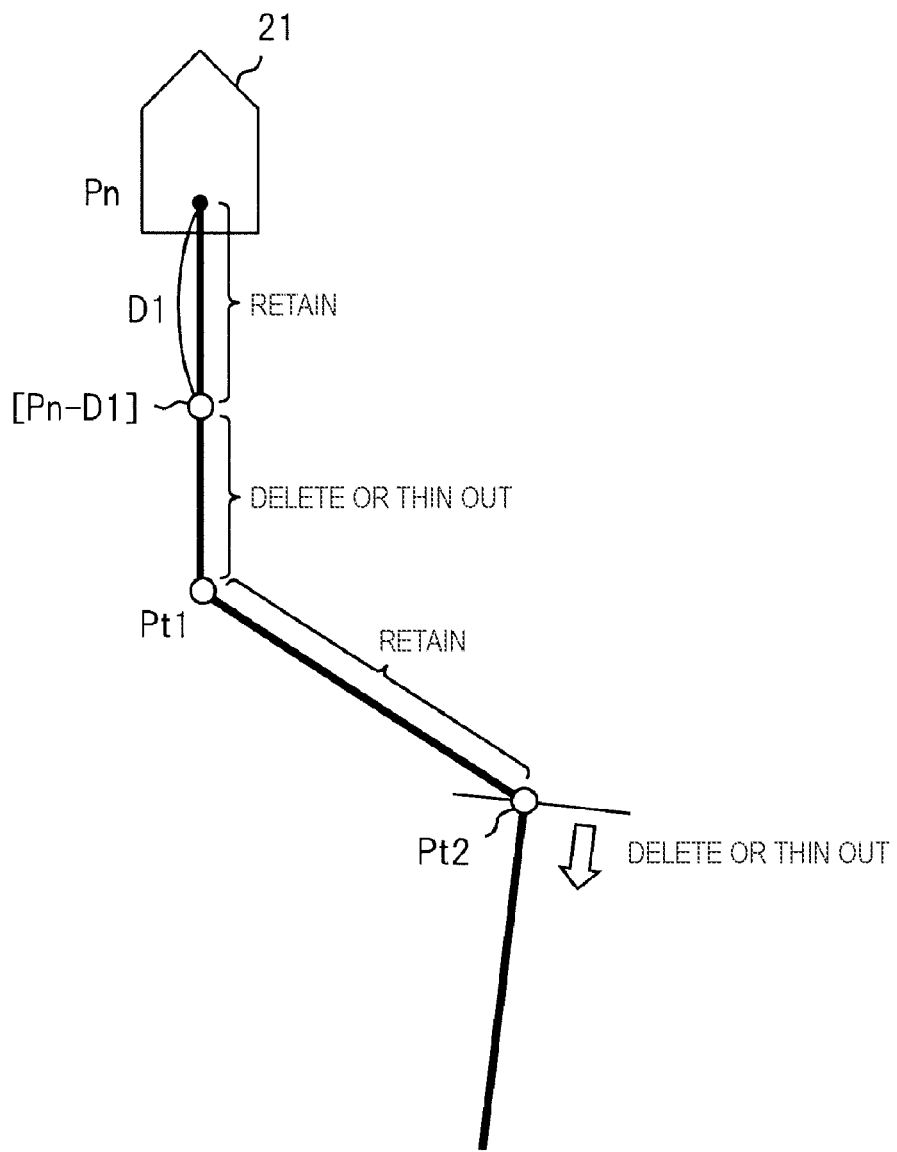
FIG. 17 is a diagram illustrative of, based on a turning point Pt2, sections for which target position data are retained and sections for which target position data are deleted or thinned out.

FIG. 17 is a diagram illustrative of, based on the turning point Pt2, sections for which target position data are retained and sections for which target position data are deleted or thinned out.

Application Example 2

Although, in the first embodiment, only one turning point Pt1 is detected, the present invention is not limited to the configuration, and a plurality of turning points may be configured to be detected. For example, it is assumed that all the points at which the turning angle θt of the vehicle becomes not smaller than the set angle θ1 are detected in a range going back from the present location Pn by a set distance D3 to a point [Pn−D3] and the detected points are denoted by turning points Pt1, Pt2, Pt3, and so on in ascending order of proximity to the present location Pn. On this basis, target position data in ranges going back from the respective turning points by the set distance D2 may be retained. Since, as described above, detection of a plurality of turning points and retention of target position data in ranges going back from the respective turning points by the set distance D2 enable the target position data and the map information to be matched with each other with the respective turning points used as reference points, the estimation accuracy of vehicle positions may be improved.

Figure 18:
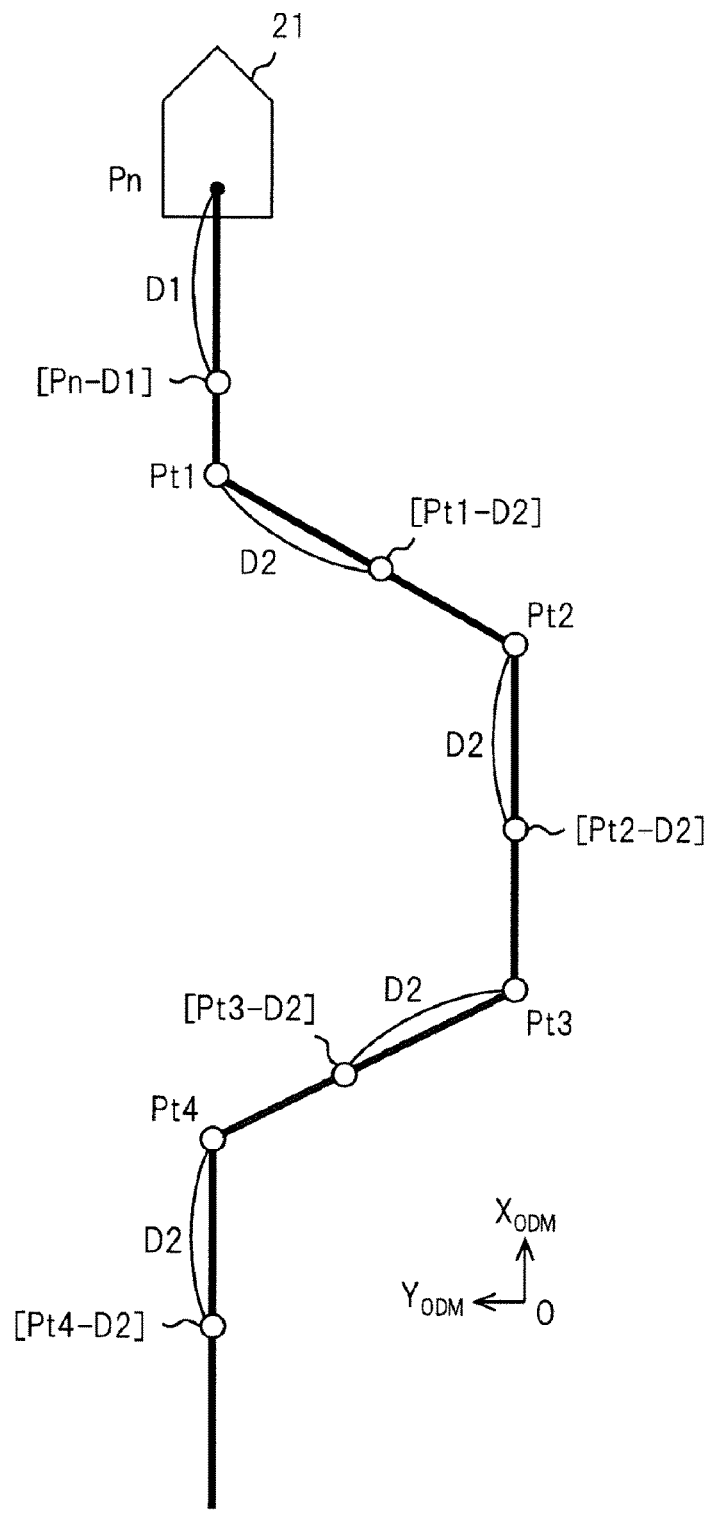
FIG. 18 is a diagram illustrative of a state in which a plurality of turning points are detected.

FIG. 18 is a diagram illustrative of a state in which a plurality of turning points are detected.

In this example, turning points Pt1, Pt2, Pt3, and Pt4 are detected. In this case, all the target position data in a range going back from the present location Pn by the set distance D1 to a point [Pn−D1], a range going back from the turning point Pt1 by the set distance D2 to a point [Pt1−D2], a range going back from the turning point Pt2 by the set distance D2 to a point [Pt2−D2], a range going back from the turning point Pt3 by the set distance D2 to a point [Pt3−D2], and a range going back from the turning point Pt4 by the set distance D2 to a point [Pt4−D2] are retained. On the other hand, the other target position data, that is, target position data in a range from the point [Pn−D1] to the turning point Pt1, a range from the point [Pt1−D2] to the turning point Pt2, a range from the point [Pt2−D2] to the turning point Pt3, a range from the point [Pt3−D2] to the turning point Pt4, and at and preceding the point [Pt4−D2] are deleted or thinned out.

When, as described above, a plurality of turning points are detected, the set angle θ1 may be configured to be variable according to the data amount of target position data that the target position detection unit 31 detected in the range going back from the present location Pn by the set distance D1. For example, the set angle θ1 is made smaller as the number N of targets relating to the curb 23, the lane markings 24, and the like decreases that the target position detection unit 31 has been able to detect in the range going back from the present location Pn by the distance D1. As described above, making the set angle θ1 smaller as the number N of targets decreases facilitates detection of even a gentler turn as the turning point Pt1 and enables the turning point Pt1 to be set at more points, the number of locations at which target position data are retained to be increased, and the number of targets required for estimating a vehicle position to be secured. Since detection of more turning points, while enabling target position data required for estimating a vehicle position to be retained, enables a data amount required for storing the other target position data to be eliminated, cumulative error in the odometry coordinate system may be reduced, and a decrease in estimation accuracy of vehicle positions may be suppressed.

Figure 19:
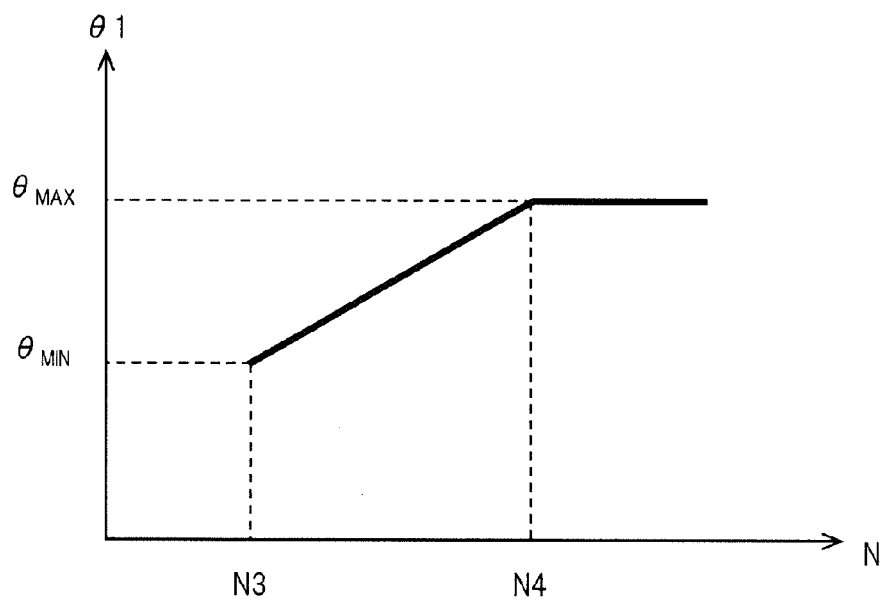
FIG. 19 is a map used for setting of the set angle θ1 according to the number N of targets.

FIG. 19 is a map used for setting of the set angle θ1 according to the number N of targets.

The abscissa and the ordinate of the map represent the number N of targets and the set angle θ1, respectively. As to the number N of targets, a value N3 that is greater than 0 and a value N4 that is greater than N3 are determined in advance. As to the set angle θ1, a value $\theta_{MIN}$ that is greater than 0 and a value $\theta_{MAX}$ that is greater than $\theta_{MIN}$ are determined in advance. The value $\theta_{MAX}$ and the value $\theta_{MIN}$ are, for example, 60 degrees and 30 degrees, respectively. Although being a quantity indicating the number of detection points, the number N of targets may be converted into a cumulative length of straight lines. When the number N of targets is not less than N4, the set angle θ1 is kept at $\theta_{MAX}$. When the number N of targets is in a range from N4 to N3, the less the number N of targets is, the smaller becomes the set angle θ1 within a range from $\theta_{MAX}$ to $\theta_{MIN}$.

<Correspondence Relationships>

In the first embodiment, the target position detection unit 31 and the processing in step S101 correspond to a "target position detection unit". The movement amount detection unit 32 and the processing in step S102 correspond to a "movement amount detection unit". The target position storage unit 33 and the processing in steps S103 and S105 correspond to a "target position storage unit". The map database 14 corresponds to a "map information acquisition unit". The turning point detection unit 34 and the processing in step S104 correspond to a "turning point detection unit". The vehicle position estimation unit 35 and the processing in step S106 correspond to a "vehicle position estimation unit". The set distance D1 corresponds to a "first set distance". The set angle θ1 corresponds to a "first set angle". The set distance D2 corresponds to a "second set distance". The set angle θ2 corresponds to a "second set angle". The set distance D3 corresponds to a "third set distance".

Advantageous Effects

Next, advantageous effects attained by a main portion in the first embodiment will be described.

(1) A vehicle position estimation device according to the first embodiment detects positions of targets present in a periphery of a vehicle, detects amounts of movements of the vehicle, and stores the positions of the targets as target position data, based on the detected amounts of movements. The vehicle position estimation device stores map information including the positions of the targets in the map database 14 in advance, and, by matching the target position data with the map information, estimates a vehicle position of the vehicle. The vehicle position estimation device detects a turning point Pt1 of the vehicle, based on the amounts of movements of the vehicle. The vehicle position estimation device retains target position data in a range going back from a present location Pn to a set distance D1 and in a range going back from the turning point Pt1 by a set distance D2 to a point [Pt1-D2].

Since, as described above, the target position data in the range going back from the present location Pn to the set distance D1 and in the range going back from the turning point Pt1 by the set distance D2 to the point [Pt1-D2] are retained, by matching the target position data with the map information with the turning point Pt1 used as a reference point, a vehicle position may be estimated uniquely. In addition, since target position data at the other points, including points in a range [D1-Pt1] and points preceding the point [Pt1-D2], are deleted or thinned out, an increase in the data amount of target position data may be suppressed and controlled appropriately.

(2) The vehicle position estimation device according to the first embodiment detects a point at which turning angle θt becomes not smaller than a set angle θ1 as a turning point Pt and, in a range going back from the present location Pn by the set distance D1, makes the set angle θ1 smaller as the number N of targets that the target position detection unit 31 detected decreases.

As described above, making the set angle θ1 smaller as the number N of targets decreases enables the turning point Pt1 to be set at more points, the number of locations at which target position data are retained to be increased, and the number of targets to be retained to be increased. While the amount of target position data that enables estimation accuracy of vehicle positions to be secured are increased, a data amount required for storing the other target position data may be eliminated.

(3) The vehicle position estimation device according to the first embodiment detects a point at which the turning angle θt becomes not smaller than the set angle θ1 as a turning point Pt and, when, going back from the present location Pn, the driving lane is a straight line and as the straight-line distance L thereof increases, makes the set angle θ1 smaller.

Since, as described above, making the set angle θ1 smaller as the straight-line distance L increases facilitates detection of the turning point Pt1 at a point that, going back from the present location Pn, is closer to the present location Pn, which may further facilitate retention of a target serving as a reference point in the traveling direction, data amount required for storing target position data may be reduced. In addition, cumulative error in the odometry coordinate system may be reduced, and a decrease in estimation accuracy of vehicle positions may be suppressed.

(4) The vehicle position estimation device according to the first embodiment makes the set distance D2 longer as the number N of targets decreases that the target position detection unit 31 detected in a range going back from the turning point Pt1 by the set distance D2.

Since, as described above, making the set angle θ1 smaller as the number N of targets decreases facilitates detection of the turning point Pt1 at a point that, going back from the present location Pn, is closer to the present location Pn, data amount required for storing target position data may be reduced.

(5) The vehicle position estimation device according to the first embodiment detects, out of a set section [(Pp−α) to (Pp+α)], a point in the set section at which an average turning angle $\theta t_{AVE}$ becomes not smaller than a set angle θ2 as the turning point Pt1.

Detection of a turning point candidate Pp as a final turning point Pt1 when the average turning angle $\theta t_{AVE}$ becomes not smaller than the set angle θ2, as described above, enables false determinations because of meandering travels to be reduced and a turning point to be judged easily and accurately.

(6) The vehicle position estimation device according to the first embodiment detects the turning point Pt1, based on changes in the traveling direction of the vehicle.

Detection of the turning point Pt1 by calculating the turning angle θt, based on changes in the traveling direction of the vehicle, as described above, enables influence from cumulative error in the odometry coordinate system and influence from changes in attitude as in a case of avoiding an obstacle to be reduced and the turning point Pt1 to be detected accurately.

(7) The vehicle position estimation device according to the first embodiment deletes or thins out target position data at points preceding a point [Pn-D3] reached by going back from the present location Pn by a predetermined set distance D3.

Deleting or thinning out target position data at points preceding the point [Pn-D3], as described above, enables an increase in the data amount of target position data to be suppressed.

(8) A vehicle position estimation method according to the first embodiment detects positions of targets present in a periphery of a vehicle, detects amounts of movements of the vehicle, and stores the positions of the targets as target position data, based on the detected amounts of movements. The vehicle position estimation method detects a turning point Pt1 of the vehicle, based on the amounts of movements of the vehicle. The vehicle position estimation method retains target position data in a range from a present location Pn to a set distance D1 and in a range going back from the turning point Pt1 by a set distance D2 to a point [Pt1-D2]. The vehicle position estimation method acquires map information including the positions of the targets from the map database 14 and, by matching the stored target position data with the positions of the targets in the map information, estimates a vehicle position of the vehicle.

Since, as described above, the target position data in the range going back from the present location Pn to the set distance D1 and in the range going back from the turning point Pt1 by the set distance D2 to the point [Pt1-D2] are retained, by matching the target position data with the map information with the turning point Pt1 used as a reference point, a vehicle position may be estimated uniquely. In addition, since target position data at the other points, including points in a range [D1-Pt1] and points preceding the point [Pt1-D2], are deleted or thinned out, an increase in the data amount of target position data may be suppressed and controlled appropriately.

Although the present invention has been described with reference to a limited number of embodiments, the scope of the present invention is not limited thereto, and modifications of the respective embodiments based on the above disclosure are obvious to those skilled in the art.

REFERENCE SIGNS LIST

11 Vehicle position estimation device
12 Radar device
13 Camera
14 Map database
15 Sensor group
16 Controller
21 Vehicle
22 Road surface
23 Curb
24 Lane marking
31 Target position detection unit
32 Movement amount detection unit
33 Target position storage unit
34 Turning point detection unit
35 Vehicle position estimation unit

The invention claimed is:

1. A vehicle position estimation device comprising:
a target position detection unit configured to detect a position of a target present in a periphery of a vehicle;
a movement amount detection unit configured to detect an amount of movement of the vehicle;
a target position storage unit configured to store positions of a target detected by the target position detection unit as target position data, based on amounts of movements detected by the movement amount detection unit;
a map information acquisition unit configured to acquire map information including positions of the target;
a vehicle position estimation unit configured to, by matching the target position data stored in the target position storage unit with positions of a target in the map information acquired by the map information acquisition unit, estimate a vehicle position of the vehicle; and
a turning point detection unit configured to detect a turning point of the vehicle from the amounts of movements of the vehicle,
wherein the target position storage unit
retains at least the target position data in a range going back from a present location by a predetermined first set distance and the target position data in a range going back from the turning point by a predetermined second set distance.

2. The vehicle position estimation device according to claim 1, wherein
the turning point detection unit
detects a point at which a turning angle of a vehicle becomes not smaller than a predetermined first set angle as the turning point, and,
as the number of the targets detected by the target position detection unit in a range going back from a present location by the first set distance decreases, makes the first set angle smaller.

3. The vehicle position estimation device according to claim 2, wherein
the turning point detection unit
detects a point at which turning angle of a vehicle becomes not smaller than a predetermined first set angle as the turning point, and
when, going back from a present location, a driving lane is a straight line and as straight-line distance increases, makes the first set angle smaller.

4. The vehicle position estimation device according to claim 2, wherein
the target position storage unit,
as the number of the targets detected by the target position detection unit in a range going back from the turning point by the second set distance decreases, makes the second set distance longer.

5. The vehicle position estimation device according to claim 2, wherein
the turning point detection unit,
out of a predetermined set section including a point at which turning angle of a vehicle becomes not smaller than the first set angle, detects a point in the set section at which an average turning angle becomes not smaller than a predetermined second set angle as the turning point.

6. The vehicle position estimation device according to claim 2, wherein
the turning point detection unit
detects a turning point, based on changes in a traveling direction of a vehicle.

7. The vehicle position estimation device according to claim 2, wherein
the target position storage unit
deletes the target position data at points preceding a point reached by going back from a present location by a predetermined third set distance.

8. The vehicle position estimation device according to claim 1, wherein
the turning point detection unit
detects a point at which turning angle of a vehicle becomes not smaller than a predetermined first set angle as the turning point, and
when, going back from a present location, a driving lane is a straight line and as straight-line distance increases, makes the first set angle smaller.

9. The vehicle position estimation device according to claim 8, wherein
the target position storage unit,
as the number of the targets detected by the target position detection unit in a range going back from the turning point by the second set distance decreases, makes the second set distance longer.

10. The vehicle position estimation device according to claim 8, wherein
the turning point detection unit,
out of a predetermined set section including a point at which turning angle of a vehicle becomes not smaller than the first set angle, detects a point in the set section at which an average turning angle becomes not smaller than a predetermined second set angle as the turning point.

11. The vehicle position estimation device according to claim 8, wherein
the turning point detection unit
detects a turning point, based on changes in a traveling direction of a vehicle.

12. The vehicle position estimation device according to claim 8, wherein
the target position storage unit
deletes the target position data at points preceding a point reached by going back from a present location by a predetermined third set distance.

13. The vehicle position estimation device according to claim 1, wherein
the target position storage unit,
as the number of the targets detected by the target position detection unit in a range going back from the turning point by the second set distance decreases, makes the second set distance longer.

14. The vehicle position estimation device according to claim 13, wherein
the turning point detection unit
detects a turning point, based on changes in a traveling direction of a vehicle.

15. The vehicle position estimation device according to claim 13, wherein
the target position storage unit
deletes the target position data at points preceding a point reached by going back from a present location by a predetermined third set distance.

16. The vehicle position estimation device according to claim 1, wherein
the turning point detection unit,
out of a predetermined set section including a point at which turning angle of a vehicle becomes not smaller than a first set angle, detects a point in the set section at which an average turning angle becomes not smaller than a predetermined second set angle as the turning point.

17. The vehicle position estimation device according to claim 16, wherein
the turning point detection unit
detects a turning point, based on changes in a traveling direction of a vehicle.

18. The vehicle position estimation device according to claim 1, wherein
the turning point detection unit
detects a turning point, based on changes in a traveling direction of a vehicle.

19. The vehicle position estimation device according to claim 1, wherein
the target position storage unit
deletes the target position data at points preceding a point reached by going back from a present location by a predetermined third set distance.

20. A vehicle position estimation method comprising:
detecting a position of a target present in a periphery of a vehicle by a target position detection unit;
detecting an amount of movement of the vehicle by a movement amount detection unit;
storing positions of a target detected by the target position detection unit as target position data, based on amounts of movements detected by the movement amount detection unit by a target position storage unit;
a turning point detection unit detecting a turning point of the vehicle from amounts of movements of the vehicle,
retaining at least the target position data in a range going back from a present location by a predetermined first set distance and the target position data in a range going back from the turning point by a predetermined second set distance by the target position storage unit;
acquiring map information including positions of the target by a map information acquisition unit; and
estimating a vehicle position of a vehicle by matching the target position data stored in the target position storage unit with positions of a target in the map information acquired by the map information acquisition unit by a vehicle position estimation unit.

* * * * *